(12) United States Patent
Yukie et al.

(10) Patent No.: US 7,043,268 B2
(45) Date of Patent: May 9, 2006

(54) WIRELESS MODEM PROCESSOR

(75) Inventors: Satoru Yukie, San Diego, CA (US); Peter Waldo, San Diego, CA (US); Duk San Kim, San Diego, CA (US); Craig M. Hagopian, San Diego, CA (US)

(73) Assignee: Axesstel, Inc., San Diego, CA (US)

( * ) Notice: Subject to any disclaimer, the term of this patent is extended or adjusted under 35 U.S.C. 154(b) by 223 days.

(21) Appl. No.: 10/672,389

(22) Filed: Sep. 26, 2003

(65) Prior Publication Data
US 2004/0121804 A1 Jun. 24, 2004

Related U.S. Application Data

(60) Provisional application No. 60/414,181, filed on Sep. 27, 2002.

(51) Int. Cl.
*H04B 1/38* (2006.01)
*H04M 1/00* (2006.01)

(52) U.S. Cl. ............ 455/557; 455/552.1; 455/426.1; 455/422.1; 455/574; 455/425; 455/452.1; 370/339; 370/467; 375/222

(58) Field of Classification Search .......... 455/557, 455/552.1, 426.1, 442, 461, 574, 425, 452.1, 455/422.1; 379/1.03; 370/338, 334, 204, 370/281, 339, 467, 395.61, 335; 375/222; 445/437
See application file for complete search history.

(56) References Cited

U.S. PATENT DOCUMENTS

| | | | | |
|---|---|---|---|---|
| 4,956,852 A * | 9/1990 | Hodge | ........................ | 375/222 |
| 4,989,230 A * | 1/1991 | Gillig et al. | ............. | 455/552.1 |
| 5,127,042 A * | 6/1992 | Gillig et al. | ............. | 455/552.1 |
| 5,463,674 A * | 10/1995 | Gillig et al. | ............. | 455/552.1 |
| 5,533,099 A * | 7/1996 | Byrne | ...................... | 455/552.1 |
| 5,649,308 A * | 7/1997 | Andrews | .................... | 370/334 |
| 5,673,308 A * | 9/1997 | Akhavan | .................... | 455/461 |
| 5,737,703 A * | 4/1998 | Byrne | ........................ | 455/442 |
| 5,794,159 A * | 8/1998 | Portin | ...................... | 455/553.1 |
| 5,930,712 A * | 7/1999 | Byrne et al. | ................ | 455/437 |
| 6,445,921 B1 * | 9/2002 | Bell | ........................ | 455/426.1 |
| 6,571,103 B1 * | 5/2003 | Novakov | .................... | 455/464 |
| 6,584,175 B1 * | 6/2003 | Kibria et al. | ............. | 379/1.03 |
| 6,744,753 B1 * | 6/2004 | Heinonen et al. | ........... | 370/338 |
| 2002/0059434 A1 * | 5/2002 | Karaoguz et al. | ........... | 709/228 |
| 2002/0187780 A1 * | 12/2002 | Souissi | ...................... | 455/426 |

FOREIGN PATENT DOCUMENTS

FR 2 810 757 A1 6/2000

\* cited by examiner

*Primary Examiner*—William Trost
*Assistant Examiner*—Chuck Huynh
(74) *Attorney, Agent, or Firm*—Samuel S. Lee; Frommer Lawrence & Haug LLP

(57) ABSTRACT

Methods and apparatus for controlling a wireless handset including two wireless modems. In one implementation, a phone includes: a first wireless modem including a controller; a first antenna connected to said first wireless modem; a second wireless modem connected to said first wireless modem; a second antenna connected to said second wireless modem; and a user interface connected to said first wireless modem; wherein said first wireless modem controls the operation of said second wireless modem and said user interface, said first wireless modem provides a first air interface, said second wireless modem provides a second air interface, and said first air interface is different from said second air interface.

24 Claims, 7 Drawing Sheets

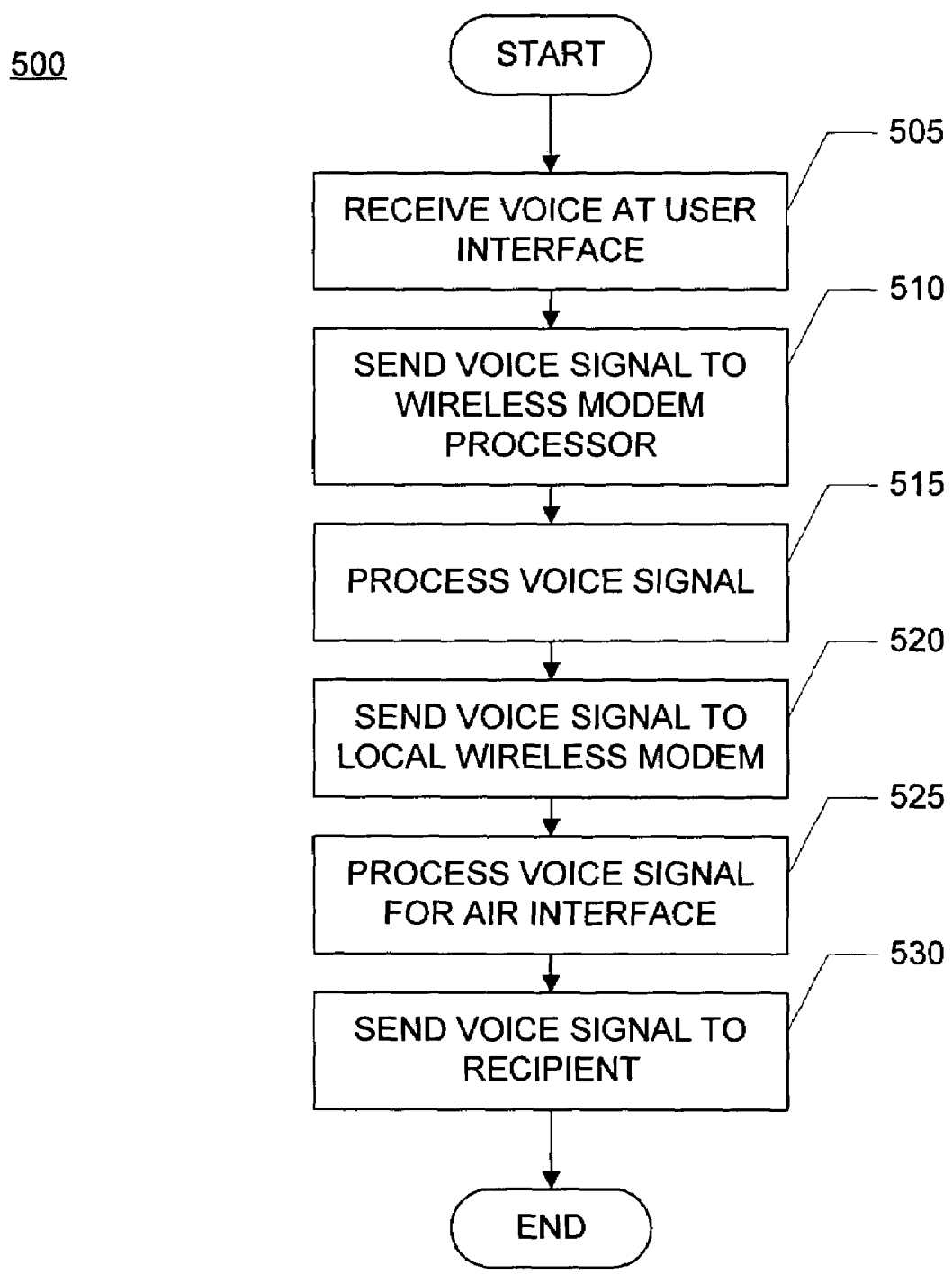

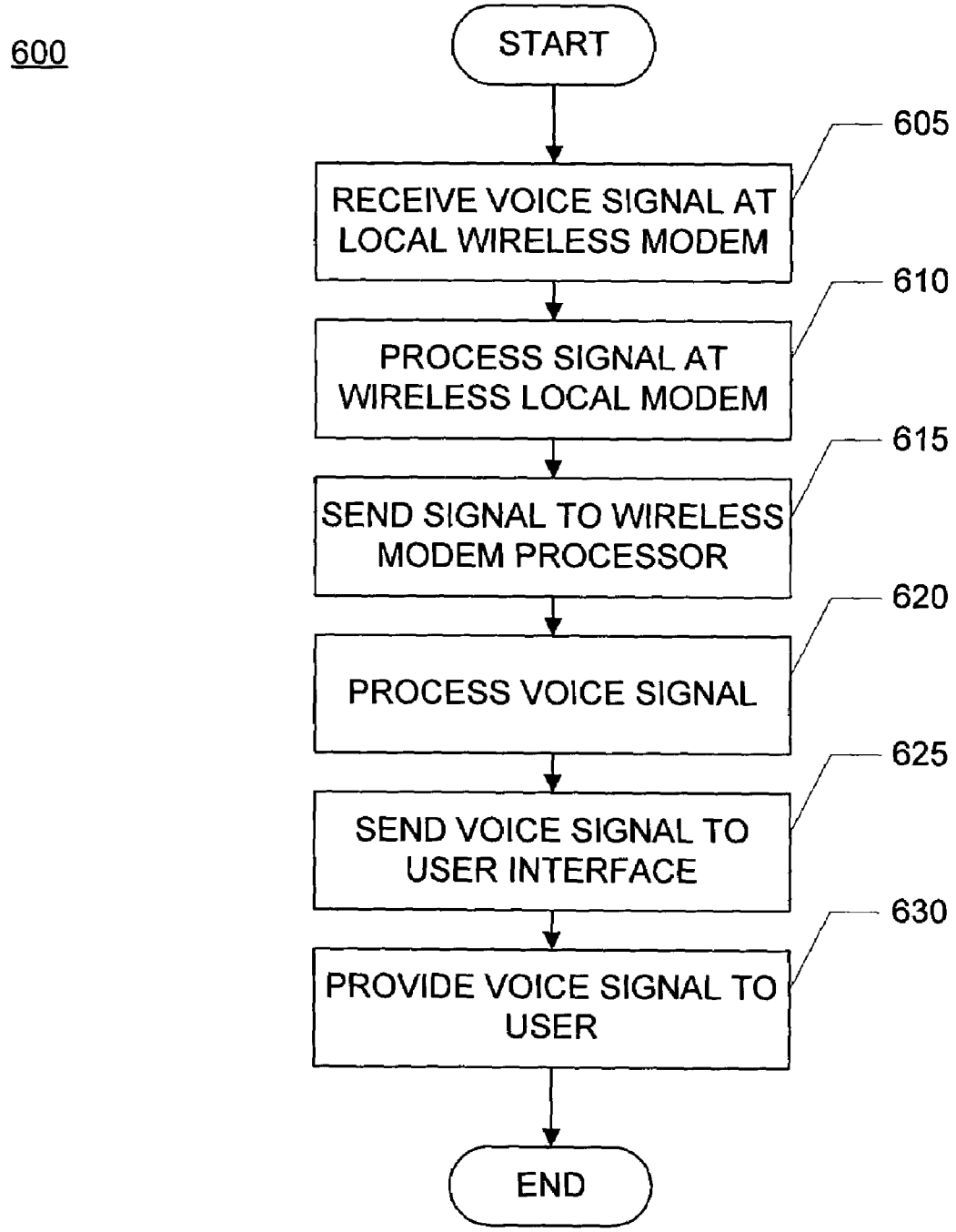

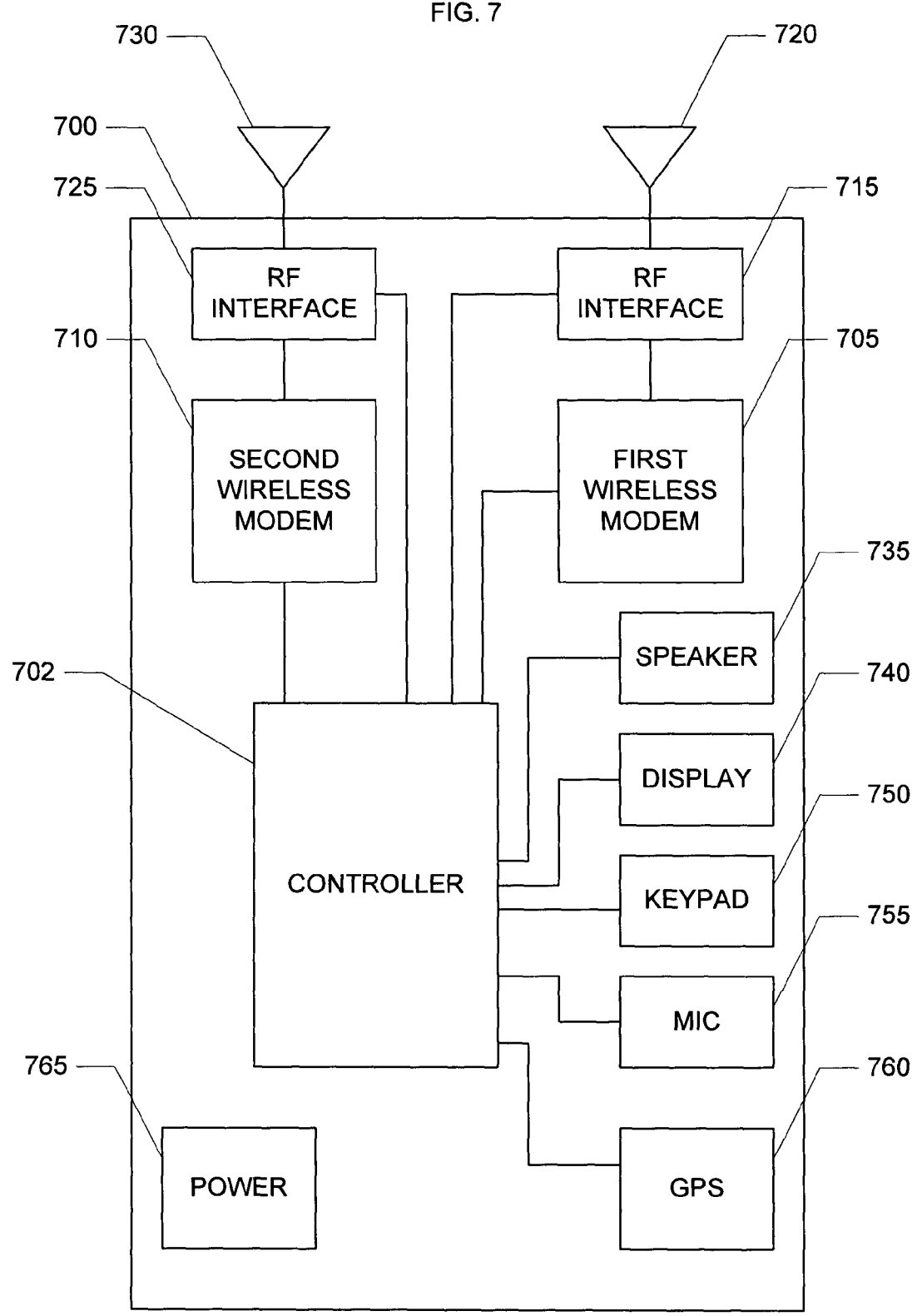

WIRELESS MODEM PROCESSOR

This application claims the benefit of U.S. provisional application No. 60/414,181, filed Sep. 27, 2002, the disclosure of which is incorporated herein by reference.

BACKGROUND

A typical wireless handset includes an integrated modem and processor for controlling the operation of the handset. The wireless handset provides a user interface for interacting with a user and a wireless interface providing an air interface for wireless telephony. The modem processes data and signals for transferring data between the wireless interface and the user interface. The modem controls the operation of the user interface for receiving data from and providing data to a user. The modem also controls the operation of the wireless interface for sending and receiving signals to and from a wireless terminal (e.g., for a typical cordless telephone) or base station (e.g., for a typical cellular phone).

SUMMARY

The present invention provides methods and apparatus for controlling a wireless handset including two wireless modems. In one implementation, a phone includes: a first wireless modem including a controller; a first antenna connected to said first wireless modem; a second wireless modem connected to said first wireless modem; a second antenna connected to said second wireless modem; and a user interface connected to said first wireless modem; wherein said first wireless modem controls the operation of said second wireless modem and said user interface, said first wireless modem provides a first air interface, said second wireless modem provides a second air interface, and said first air interface is different from said second air interface.

In another implementation, a phone includes: a controller; a first wireless modem connected to said controller; a first antenna connected to said first wireless modem; a second wireless modem connected to said controller; a second antenna connected to said second wireless modem; and a user interface connected to said controller; wherein said controller controls the operation of said first wireless modem, said second wireless modem, and said user interface, said first wireless modem provides a first air interface, said second wireless modem provides a second air interface, and said first air interface is different from said second air interface.

In another implementation, a method of controlling a phone includes: sending a modem control signal from a first wireless modem to a second wireless modem; sending a user interface control signal from said first wireless modem to a user interface; sending communication data from said user interface to said second wireless modem according to said user interface control signal; and sending said communication data from said second wireless modem to an antenna according to said modem control signal.

In another implementation, a method of controlling a phone includes: receiving incoming communication data through an antenna at a first wireless modem; sending a modem feedback signal from said first wireless modem to a second wireless modem; sending a modem control signal from said second wireless modem to said first wireless modem; sending a user interface control signal from said second wireless modem to a user interface; and sending said incoming communication data from said first wireless modem to said user interface according to said modem control signal.

BRIEF DESCRIPTION OF THE DRAWINGS

FIG. 5 shows a flow chart of one implementation of sending a voice signal while conducting a call.

FIG. 6 shows a flow chart of one implementation of receiving a voice signal while conducting a call.

FIG. 7 shows a block diagram of another implementation of a wireless handset.

DETAILED DESCRIPTION

The present invention provides methods and apparatus for controlling a wireless handset including two wireless modems. In one implementation, a wireless handset includes a first modem and a second modem. Each modem provides a respective air interface for wireless telephony. The first modem includes an integrated processor and controller. The first modem controls the operation of the handset and the operation of the second modem. Accordingly, the wireless handset sends and receives signals using the first air interface of the first modem at the control of the first modem. The wireless handset also sends and receives signals using the second air interface at the control of the first modem.

An illustrative example of one implementation is described below. Additional variations are described after this example.

In one example of one implementation, a phone is implemented as a wireless handset including two wireless modems. The first wireless modem is a cellular/PCS modem processor providing an air interface to a wireless network, such as a CDMA or GSM network. The second wireless modem is a local wireless modem processor providing an air interface to a local wireless terminal, such as to a typical 900 MHz cordless phone system. The first wireless modem includes processing and control functionality for controlling the operation of the handset and both modems. The second wireless modem controls its own operation and does not control the operation of components outside the second wireless modem. Accordingly, the first wireless modem controls the flow of data and signals through the handset, such as between a microphone and the second wireless modem.

In this example, the first wireless modem includes general control functionality for the handset and the second wireless modem only includes control functionality specific to the operation of the second wireless modem. Because the second wireless modem does not include general control functionality, the construction and operation of the second wireless modem is simplified. In this way, the design and manufacturing of the second wireless modem can be accomplished at a reduced cost. In addition, the second wireless modem can be designed to consume less power. Further-more, the first wireless modem can access the wireless connection provided by the second wireless modem.

Figure 1:
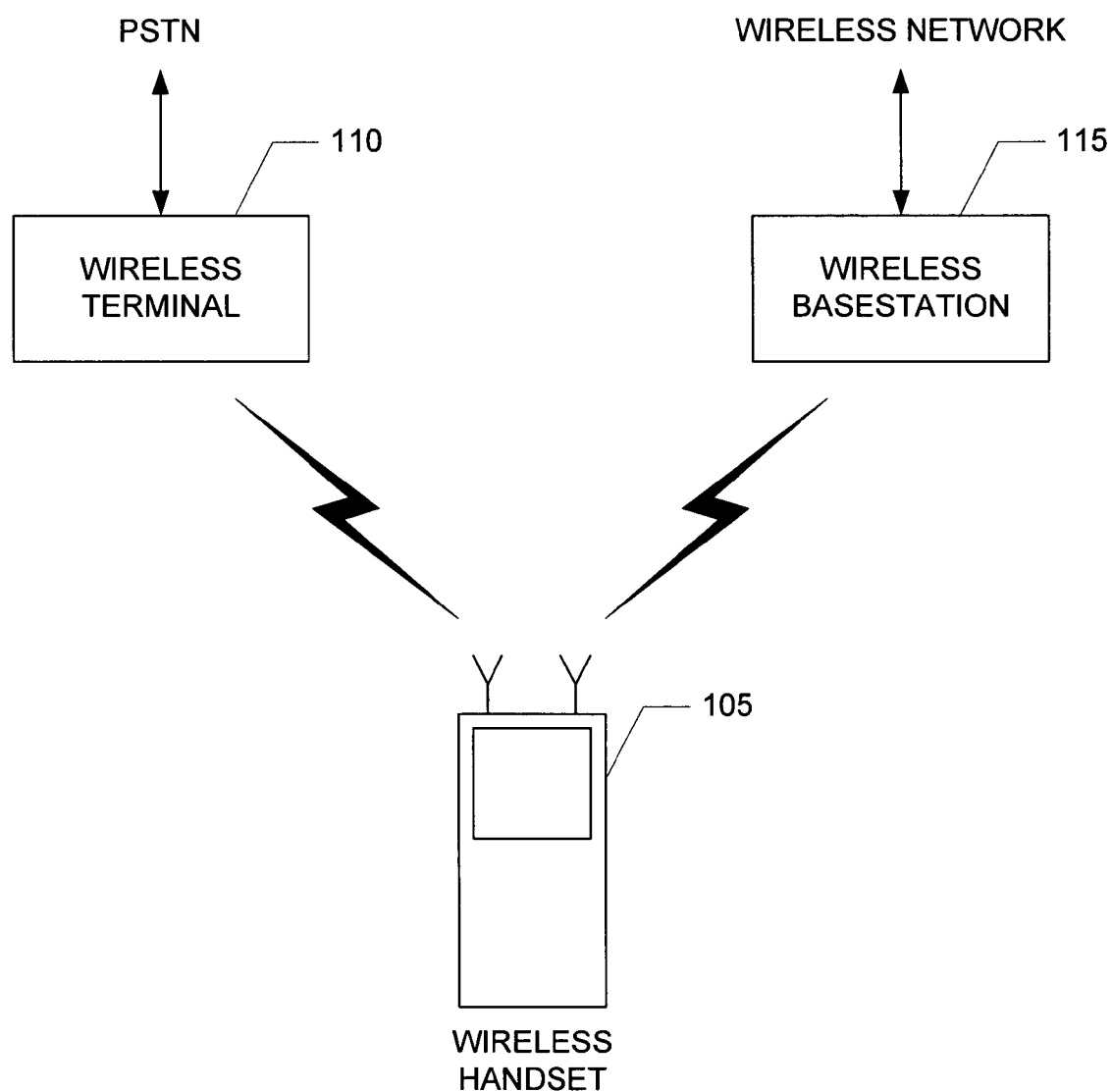
FIG. 1 shows a representation of one implementation of a wireless handset providing wireless connections to a wireless terminal and a wireless base station.

FIG. 1 shows a representation of one implementation of a wireless handset 105 providing wireless connections to a wireless terminal 110 and a wireless base station 115. The wireless handset 105 provides two air interfaces. The wireless handset 105 includes a respective modem for each supported air interface. The wireless handset 105 communicates with the wireless terminal 110 through one air interface. In one implementation, the wireless terminal 110 is a typical cordless phone terminal and provides a connection to the PSTN (public switched telephone network). The wireless handset 105 communicates with the wireless base station 115 through the other air interface. In one implementation, the wireless base station 115 is a typical cellular or PCS base station and provides a connection to a wireless network (e.g., a CDMA, TDMA, or GSM network).

Figure 2:
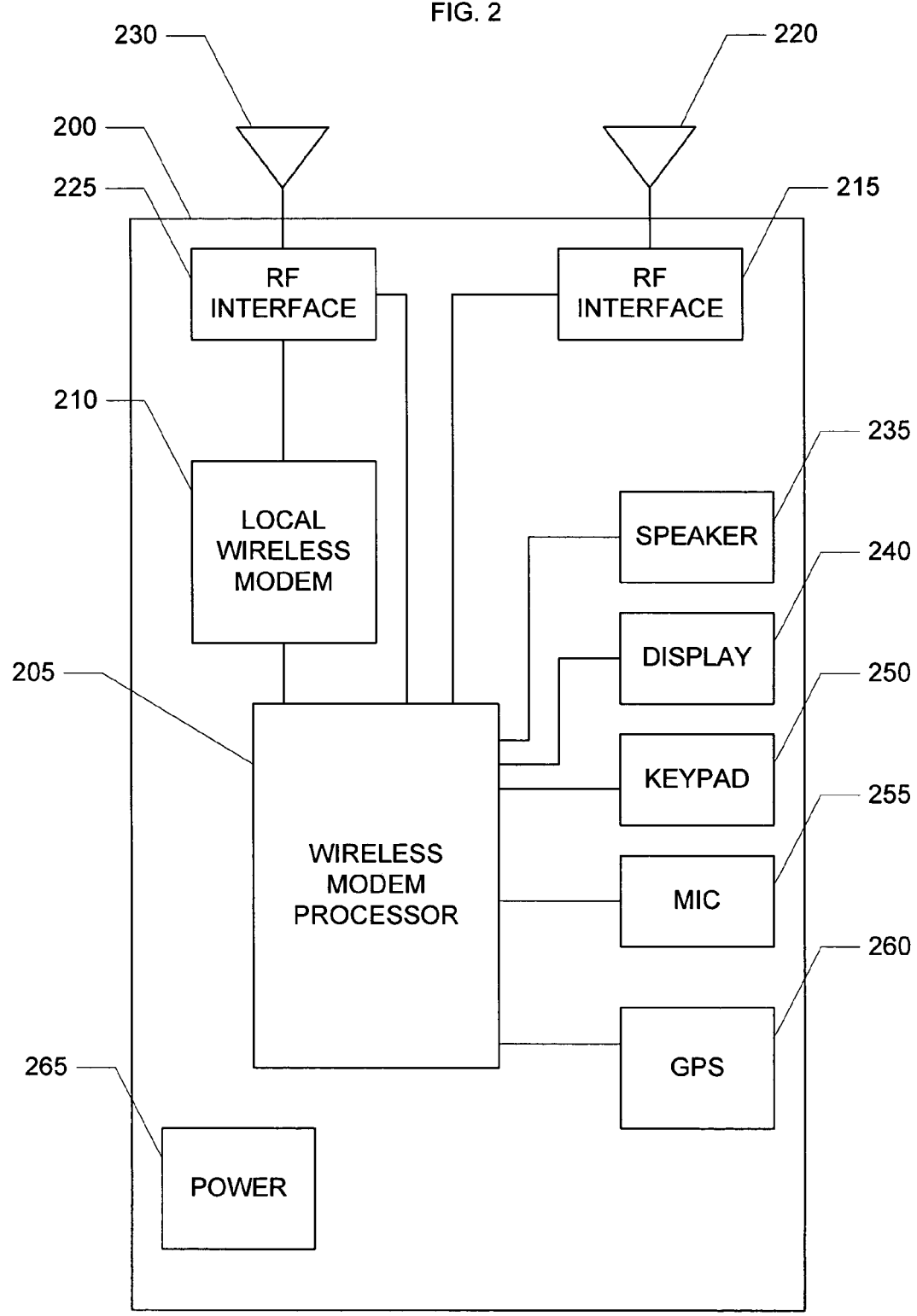
FIG. 2 shows a block diagram of one implementation of a wireless handset.

FIG. 2 shows a block diagram of one implementation of a wireless handset 200, such as implementing the wireless handset 105 shown in FIG. 1. The handset 200 includes a wireless modem processor 205 and a local wireless modem 210. The wireless modem processor 205 is a wireless telephony modem and supports a wireless phone connection and protocol or air interface for communication with a wireless network, such as a cellular, PCS, or fixed wireless connection (e.g., such as CDMA, TDMA, or GSM among others). In one implementation, the wireless network is a cellular or PCS network used for wireless mobile handsets (e.g., cell phones). In another implementation, the wireless network is a wireless local loop network. In one implementation, the wireless network is connected to the PSTN. The local wireless modem 210 is another wireless telephony modem and supports a wireless phone connection and protocol or air interface for local or short-range communication with a wireless device or terminal, such as a typical analog cordless connection, a digital cordless connection, a private trunk radio interface, or a wireless LAN connection (e.g., 802.11 or "Wi-Fi"). In one implementation, the wireless terminal is connected to the PSTN. The wireless modem processor 205 and the local wireless modem 210 are connected to one another. In one implementation, the wireless modem processor 205 and the local wireless modem 210 are implemented as respective chips and are connected to each other through general-purpose input/output pins.

The wireless modem processor 205 is connected to a first radio interface 215 which is in turn connected to an antenna 220. In one implementation, the first radio interface 215 is a typical radio interface supporting the air interface of the wireless modem processor 205 and includes: radio frequency (RF) components, a duplexer, a low noise amplifier (LNA), a bandpass filter (BPF), an isolator, and a power amplifier. The first radio interface 215 operates similarly to typical radio interfaces in mobile wireless handsets supporting the air interface of the wireless modem processor 205. For sending signals using the air interface of the wireless modem processor 205 to the wireless network (e.g., to the wireless base station 115 shown in FIG. 1), the wireless modem processor 205 provides modulated signals to the first radio interface 215 and on to the antenna 220. For receiving signals using the air interface of the wireless modem processor 205, the antenna 220 provides a signal received from the wireless network to the first radio interface 215 and on to the wireless modem processor 205.

The local wireless modem 210 is connected to a second radio interface 225 which is in turn connected to a second antenna 230. The second radio interface 225 and antenna 230 operate similarly to the first radio interface 215 and antenna 220 to send and receive signals between the local wireless modem 210 and a wireless terminal (e.g., the wireless terminal 110 shown in FIG. 1).

In an alternative implementation, the wireless modem processor is connected to multiple radio interfaces and antennas to support dual- or multi-mode operation. For example, in one implementation, the wireless modem processor is connected to an 800 MHz analog radio interface, an 800 MHz CDMA radio interface, and a 1900 MHz CDMA radio interface. Similarly, in another implementation, the local wireless modem is connected to multiple radio interfaces and antennas.

The wireless modem processor 205 includes control components and memory for controlling the operation of the handset 200. The wireless modem processor 205 controls the operation of the local wireless modem 210 and the interaction of the local wireless modem 210 with the other components of the handset 200. In one view, the wireless modem processor 205 is a primary or master processor and the local wireless modem 210 is a secondary or slave processor. Accordingly, the local wireless modem 210 controls the processing of signals for the air interface of the local wireless modem 210, but the wireless modem processor 205 causes the local wireless modem 210 to send and receive the signals. In an alternative implementation, the local wireless modem controls sending and receiving signals to and from the corresponding radio interface for the local wireless modem and then sends and receives signals to and from the wireless modem processor to interact with the remainder of the handset (e.g., the user interface).

The resources of the wireless modem processor 205 are shared for handling calls using both the wireless modem processor 205 and the local wireless modem 210. Because control is centralized in the wireless modem processor 205, the local wireless modem 210 does not need to include control components and memory for processing beyond supporting the air interface of the local wireless modem 210. The local wireless modem 210 does not need to include redundant components already included in the wireless modem processor 205. Examples of components that can be removed from the local wireless modem 210 include, but are not necessarily limited to, components providing: memory, coded (coder/decoder), power management, RF signal processing not specific to the air interface, synthesizing, and modem processing not specific to the air interface. As a result, the design and manufacture of the local wireless modem 210 can be simplified.

In an alternative implementation, the secondary modem (e.g., the local wireless modem) includes components that are also included in the primary modem (e.g., the wireless modem processor). In this case, the secondary modem uses its own components for processing (e.g., preparing information to be sent across a wireless connection or controlling the user interface), but the secondary modem acts at the control of the primary modem. In another implementation, the secondary modem uses its redundant components for parallel operation or for back-up purposes (e.g., when a component of the primary modem has failed).

In another implementation, the primary and secondary modems are integrated as a single component (e.g., as a single ASIC). In this case, the secondary modem functionality is provided as a subsystem of the primary modem. In one such implementation, the secondary modem functionality is supported by an appropriate set of instructions of a programmable processor in the primary modem.

The handset 200 also includes additional components typical of a wireless handset, including, but not limited to:

a speaker 235, a display 240, a keypad 250, a microphone 255, a GPS 260 (global positioning system), and a power source 265 (e.g., a battery or external power connection; the connections between the power source 265 and the other components of the handset 200 are omitted for clarity). The wireless modem processor 205 controls the operation of these components and the interaction among these components, the wireless modem processor 205, and the local wireless modem 210.

As shown in FIG. 2, the local wireless modem 210 is not directly connected to the user interface of the handset 200 (e.g., the speaker 235, the display 240, the keypad 250, or the microphone 255) or other subsystems of the handset 200 (e.g., the GPS 260). The local wireless modem 210 sends and receives signals for these components through the wireless modem processor 205. In an alternative implementation, the local wireless modem has a direct connection to other handset components, but the interaction is controlled by the wireless modem processor.

In another implementation, the wireless modem processor provides a local or shortrange wireless air interface instead of a cellular or PCS air interface. In this case, the handset provides wireless connections for two local wireless devices.

In another implementation, instead of a local wireless modem, the handset includes a wireless modem providing a second cellular or PCS air interface different from that of the wireless modem processor. For example, the wireless modem processor provides a CDMA interface and the second wireless modem provides a GSM interface.

In another implementation, the handset includes additional wireless modems. In this case, the handset supports three or more air interfaces. The handset includes a wireless modem processor and two or more wireless modems. For example, in one implementation, a handset includes a wireless modem processor providing a CDMA air interface, a wireless modem providing a GSM interface, a local wireless modem providing a cordless telephone interface, and a local wireless modem providing a personal wireless interface (e.g., Bluetooth). The single wireless modem processor controls the operation and interaction of the wireless modems and the other components of the handset.

In another implementation, the handset also includes one or more wired interfaces, such as a RJ-11 and/or a RJ-45 interface. In this case, the handset includes a modem or network components to support the wired interface.

The handset supports placing and receiving calls through the wireless modem processor similarly to a typical wireless handset supporting the same air interface as the wireless modem processor. The wireless modem processor controls the flow and processing of signals to send and receive signals between the user interface and the wireless network corresponding to the air interface of the wireless modem processor. For placing and receiving calls through the local wireless modem, the handset uses the local wireless modem at the control of the wireless modem processor.

In addition, during the course of operation, the wireless modem processor causes the user interface to provide feedback to the user to indicate the status of the handset or the progress of an operation. The wireless modem processor controls the user interface for calls through the wireless modem processor and for calls through the local wireless modem. The wireless modem processor receives status information from the local wireless modem indicating the status and operation of the local wireless modem. For example, after a call has been placed through the local wireless modem but before the connection has been opened (e.g., before the call recipient has answered the call), the wireless modem processor sends control signals to the user interface to cause the user interface to provide an audio signal through a speaker indicating that the recipient's phone is ringing.

Figure 3:
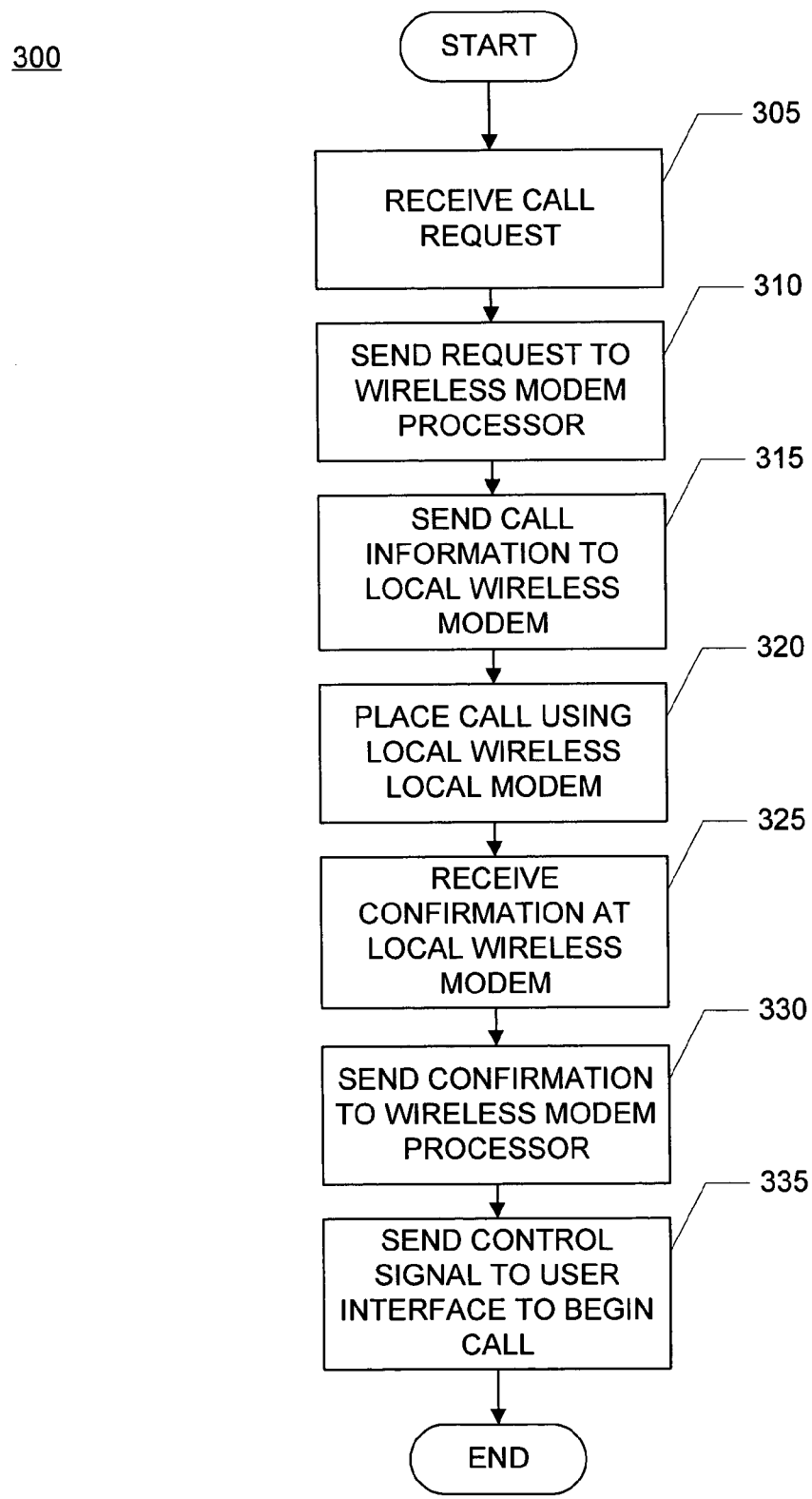
FIG. 3 shows a flow chart of one implementation of placing a call with a wireless handset using a local wireless modem at the control of a wireless modem processor.

FIG. 3 shows a flow chart 300 of one implementation of placing a call with a wireless handset using a local wireless modem at the control of a wireless modem processor. Initially, a user has activated the handset. The user interface of the handset receives a request to place a call, block 305. A user places a call request by entering information through the user interface of the handset, such as by entering a phone number through a keypad and pressing a send button. While the user is entering information through the user interface, the wireless modem processor controls the user interface to provide appropriate feedback to the user (e.g., displaying numbers on the display of the handset as the user enters numbers through the keypad).

The user interface passes the call request to the wireless modem processor, block 310. The wireless modem processor receives and processes the call request. For example, the wireless modem processor determines the phone number to which to place the call. The wireless modem processor determines that the call request is for the local wireless modem. The call request indicates that the call is to be placed using the air interface of the local wireless modem. Alternatively, the wireless modem processor determines that the call is to be placed through the local wireless modem based on other information (e.g., the wireless modem processor places calls using the local wireless modem only while the handset is within the range of the local wireless modem). The wireless modem processor passes the call request information to the local wireless modem, block 315.

The local wireless modem places a call according to the call request through the air interface of the local wireless modem, block 320. The local wireless modem derives the appropriate information to place a call from the received call request information. The local wireless modem prepares the information according to the air interface of the local wireless modem. The local wireless modem sends the call request information to a wireless terminal through a radio interface and antenna to place the call.

If the call is placed successfully, the local wireless modem receives a confirmation that the call has been placed and a connection has been opened, block 325. The local wireless modem receives the confirmation through the antenna and radio interface corresponding to the air interface of the local wireless modem. The local wireless modem passes the confirmation to the wireless modem processor, block 330. The wireless modem processor generates control information for the user interface and passes the control information to the user interface to begin the call, block 335. The control information causes the user interface to display or provide appropriate feedback information to the user to confirm that the call has been placed and that the call can begin.

Figure 4:
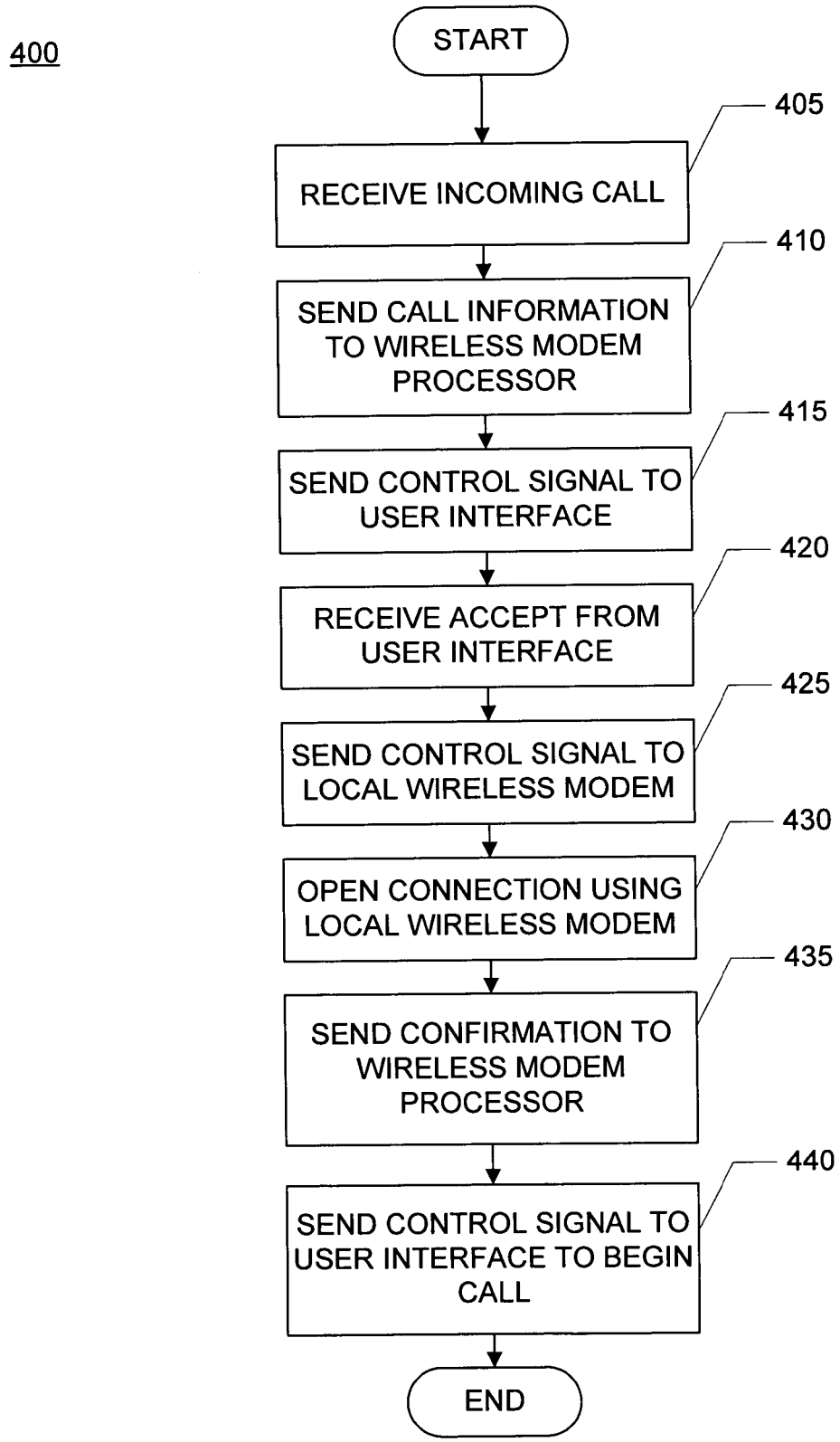
FIG. 4 shows a flow chart of one implementation of receiving a call with a handset using a local wireless modem at the control of a wireless modem processor.

FIG. 4 shows a flow chart 400 of one implementation of receiving a call with a handset using a local wireless modem at the control of a wireless modem processor. Initially, a user has activated the handset. The local wireless modem receives a signal indicating an incoming call from a wireless terminal, block 405. The local wireless modem receives the incoming call signal through a connected antenna and radio interface. The incoming call signal indicates an incoming call request.

The local wireless modem processes the incoming call signal and passes the incoming call request to the wireless modem processor, block 410. The wireless modem processor processes the incoming call request and generates control signals for the user interface reflecting the incoming call request. The wireless modem processor passes the control signals to the user interface and causes the user interface to indicate the incoming call request, block 415. For example, in one implementation, the wireless modem processor causes a speaker to produce an audio tone (e.g., a ringing tone) and causes a display to display information about the incoming call (e.g., the caller's phone number).

If the user accepts the incoming call, the user interface passes a call accept signal to the wireless modem processor, block 420. The wireless modem processor processes the call accept signal and generates control signals to cause the local wireless modem to accept the incoming call and open a connection to the caller. The wireless modem processor passes the control signals to the local wireless modem, block 425. The local wireless modem opens a connection to the caller through the wireless connection to the wireless terminal, block 430.

The local wireless modem receives a confirmation that the connection has been opened, and passes the confirmation to the wireless modem processor, block 435. The wireless modem processor sends control signals to the user interface to begin the call, block 440.

FIG. 5 shows a flow chart 500 of one implementation of sending a voice signal while conducting a call. Initially, a user has activated a handset and opened a connection to another handset using the local wireless modem at the control of the wireless modem processor, such as by placing or receiving a call. The user interface receives information from the user, block 505. The user interface converts the information to a signal. For example, the user speaks into a microphone and the user interface creates an audio signal. The user interface passes the signal to the wireless modem processor, block 510.

The wireless modem processor processes the signal from the user interface to prepare to send the signal to the other handset, block 515. For example, in one implementation, the wireless modem processor converts the signal from an analog signal to a digital signal using an analog to digital converter (ADC). The wireless modem processor sends the processed signal to the local wireless modem, block 520.

The local wireless modem processes the received signal, block 525. The local wireless modem prepares the received signal to be sent to a wireless terminal according to the air interface of the local wireless modem. For example, in one implementation, the local wireless modem modulates the received signal to a carrier signal. The local wireless modem sends the processed signal to the wireless terminal to be sent to the other handset, block 530. The local wireless modem sends the signal using the connected radio interface and antenna.

FIG. 6 shows a flow chart 600 of one implementation of receiving a voice signal while conducting a call. Initially, a user has activated a handset and opened a connection to another handset using the local wireless modem at the control of the wireless modem processor, such as by placing or receiving a call.

The local wireless modem receives a signal from the other handset, block 605. The local wireless modem receives the signal through the connected antenna and radio interface. The local wireless modem processes the received signal, block 610. The local wireless modem processes the received signal according to the air interface of the local wireless modem. For example, in one implementation, and the local wireless modem demodulates a voice signal from the received signal. The local wireless modem sends the processed signal to the wireless modem processor, block 615.

The wireless modem processor processes the signal from the local wireless modem, block 620. The wireless modem processor processes the signal to prepare the signal for presentation through the user interface. For example, in one implementation, the wireless modem processor converts the signal from a digital signal to an analog signal using a digital to analog converter (DAC). The wireless modem processor sends the processed signal to the user interface, block 625. The user interface presents the received signal to the user, block 630. In one implementation, the user interface plays a received voice signal through a speaker.

The handset processes other information input through the user interface while conducting a call using the local wireless modem at the control of the wireless modem processor in a similar way. For example, when a user presses keys on a keypad of the user interface, the user interface provides the signals to the wireless modem processor and the wireless modem processor and creates appropriate control and data signals according to the input information. If the input information is to be sent to the other handset, the wireless modem processor provides control and data signals to the local wireless modem.

FIG. 7 shows a block diagram of another implementation of a wireless handset 700. The wireless handset 700 includes a controller 702, a first wireless modem 705, and a second wireless modem 710. The controller 702 controls the operation of the handset 700 including the operation and interaction of the wireless modems 705, 710. The first wireless modem 705 and the second wireless modem 710 are connected to the controller 702. The wireless modems 705, 710 are wireless telephony modems, each providing a respective air interface. For example, in one implementation, the first wireless modem 705 provides a cellular or PCS air interface (e.g., a CDMA interface), and the second wireless modem 710 provides a local wireless interface (e.g., a cordless telephone interface). Because the controller 702 controls the operation of the handset 700 the wireless modems 705, 710 do not need to include control components for controlling components outside the wireless modems 705, 710, similar to the local wireless modem 210 shown in FIG. 2. The other components of the wireless handset 700 shown in FIG. 7 are similar to the corresponding components of the wireless handset 200 shown in FIG. 2, and operate in a similar way. In an alternative implementation, a wireless handset includes a controller and three or more wireless modems, each providing a respective air interface.

The various implementations of the invention are realized in electronic hardware, computer software, or combinations of these technologies. Some implementations include one or more computer programs executed by a programmable processor or computer. For example, referring to FIG. 2, in one implementation, the handset 200 includes one or more programmable processors (e.g., in the wireless modem processor 205). As discussed above, in one implementation, the handset includes a processor and user interface components for interacting with a user. In general, a computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations using a wireless modem providing a wide area air interface and a second wireless modem providing a local wireless air interface, in other implementations, additional or different wireless modems can be included. In another alternative implementation, a wired modem can also be included (e.g., for data transmission across a standard wired telephone connection). In another implementation, the wireless modems are included in a device other than a wireless handset, such as in a laptop computer or PDA (personal digital assistant).

Accordingly, the present invention is not limited to only those implementations described above.

What is claimed is:

1. A phone, comprising:
a first wireless modem including a controller;
a first antenna connected to said first wireless modem;
a second wireless modem connected to said first wireless modem;
a second antenna connected to said second wireless modem; and
a user interface connected to said first wireless modem;
wherein said first wireless modem controls the operation of said user interface,
said first wireless modem provides a first air interface,
said second wireless modem provides a second air interface, and
said first air interface is different from said second air interface;
wherein said second wireless modem includes control functionality only for operation of said second air interface, and
wherein said first wireless modem controls the operation said of second wireless modem
such that said first wireless modem manages the operations of both said first air interface and said second air interface.

2. The phone of claim 1, wherein:
said first wireless modem provides a cellular air interface.

3. The phone of claim 1, wherein:
said first wireless modem provides a PCS air interface.

4. The phone of claim 1, wherein:
said first wireless modem provides a CDMA air interface.

5. The phone of claim 1, wherein:
said second wireless modem provides a cordless telephone air interface.

6. The phone of claim 1, wherein:
said second wireless modem provides a wireless LAN air interface.

7. The phone of claim 1, wherein:
said second wireless modem exchanges data with said user interface through said first wireless modem.

8. The phone of claim 1, further comprising:
a third wireless modem connected to said first wireless modem;
wherein said third wireless modem provides a third air interface, and said third air interface is different from said first air interface and from said second air interface.

9. A method of controlling a phone, comprising:
sending a modem control signal from a first wireless modem to a second wireless modem,
wherein said first wireless modem controls the operation of said second wireless modem,
wherein said first wireless modem provides a first air interface,
wherein said second wireless modem provides a second air interface,
wherein said first air interface is different from said second air interface,
wherein said second wireless modem includes control functionality only for operation of said second air interface, and
wherein said first wireless modem controls the operation of said second wireless modem such that said first wireless modem manages the operations of both said first air interface and said second air interface;
sending a user interface control signal from said first wireless modem to a user interface;
wherein said first wireless modem controls the operation of said user interface;
sending communication data from said user interface to said second wireless modem according to said user interface control signal; and
sending said communication data from said second wireless modem to an antenna according to said modem control signal.

10. The method of claim 9, wherein:
said first wireless modem provides a first air interface,
said. second wireless modem provides a second air interface, and
said first air interface is different from said second air interface.

11. The method of claim 10, wherein:
said first wireless modem provides a CDMA interface, and
said second wireless modem provides a cordless telephone interface.

12. The method of claim 9, wherein:
said sending communication data from said user interface to said second wireless modem includes sending said communication data from said user interface to said first wireless modem and sending said communication data from said first wireless modem to said second wireless modem.

13. The method of claim 12, further comprising:
processing said communication data at said first wireless modem to prepare said communication data for said second wireless modem.

14. The method of claim 9, further comprising:
sending a modem feedback signal from said second wireless modem to said first wireless modem.

15. The method of claim 9, further comprising:
receiving incoming communication data through said antenna at said second wireless modem;
sending a modem feedback signal from said second wireless modem to said first wireless modem;
sending a second modem control signal from said first wireless modem to said second wireless modem;
sending said incoming communication data from said second wireless modem to said user interface according to said second modem control signal.

16. The method of claim 15, wherein:
said sending incoming communication data from said second wireless modem to said user interface includes sending said incoming communication data from second wireless modem to said first wireless modem and sending said incoming communication data from said first wireless modem to said user interface.

17. The method of claim 16, further comprising:
processing said incoming communication data at said first wireless modem to prepare said incoming communication data for said user interface.

18. A method of controlling a phone, comprising:
receiving incoming communication data through an antenna at a first wireless modem;
sending a modem feedback signal from said first wireless modem to a second wireless modem;
sending a modem control signal from said second wireless modem to said first wireless modem,
  wherein said second wireless modem controls the operation of said first wireless modem,
  wherein said first wireless modem provides a first air interface,
  wherein said second wireless modem provides a second air interface,
  wherein said first air interface is different from said second air interface,
  wherein said second wireless modem includes control functionality only for operation of said second air interface, and
  wherein said first wireless modem controls the operation of said second wireless modem such that said first wireless modem manages the operations of both said first air interface and said second air interface;
sending a user interface control signal from said second wireless modem to a user interface,
  wherein said second wireless modem controls the operation of said user interface; and
sending said incoming communication data from said first wireless modem to said user interface according to said modem control signal.

19. The method of claim 18, wherein:
said first wireless modem provides a first air interface,
said second wireless modem provides a second air interface, and
said first air interface is different from said second air interface.

20. The method of claim 19, wherein:
said first wireless modem provides a cordless telephone interface, and
said second wireless modem provides a CDMA interface.

21. The method of claim 18, wherein:
said sending incoming communication data from said first wireless modem to said user interface includes sending said incoming communication data from first wireless modem to said second wireless modem and sending said incoming communication data from said second wireless modem to said user interface.

22. The method of claim 21, further comprising:
processing said incoming communication data at said second wireless modem to prepare said incoming communication data for said user interface.

23. A system for controlling a phone, comprising:
means for sending a modem control signal from a first wireless modem to a second wireless modem,
  wherein said first wireless modem controls the operation of said second wireless modem;
means for sending a user interface control signal from said first wireless modem to a user interface,
  wherein said first wireless modem controls the operation of said user interface;
means for sending communication data from said user interface to said second wireless modem according to said user interface control signal; and
means for sending said communication data from said second wireless modem to an antenna according to said modem control signal;
wherein said first wireless modem provides a first air interface,
said second wireless modem provides a second air interface, and
said first air interface is different from said second air interface;
wherein said second wireless modem includes control functionality only for operation of said second air interface, and
wherein said first wireless modem controls the operation of said second wireless modem such that said first wireless modem manages the operations of both said first air interface and said second air interface.

24. A system for controlling a phone, comprising:
means for receiving incoming communication data through an antenna at a first wireless modem;
means for sending a modem feedback signal from said first wireless modem to a second wireless modem;
means for sending a modem control signal from said second wireless modem to said first wireless modem,
  wherein said second wireless modem controls the operation of said first wireless modem;
means for sending a user interface control signal from said second wireless modem to a user interface,
  wherein said second wireless modem controls the operation of said user interface; and
means for sending said incoming communication data from said first wireless modem to said user interface according to said modem control signal;
wherein said first wireless modem provides a first air interface,
said second wireless modem provides a second air interface, and
said first air interface is different from said second air interface;
wherein said second wireless modem includes control functionality only for operation of said second air interface, and
wherein said first wireless modem controls the operation of said second wireless modem such that said first wireless modem manages the operations of both said first air interface and said second air interface.

* * * * *